Patented June 8, 1948

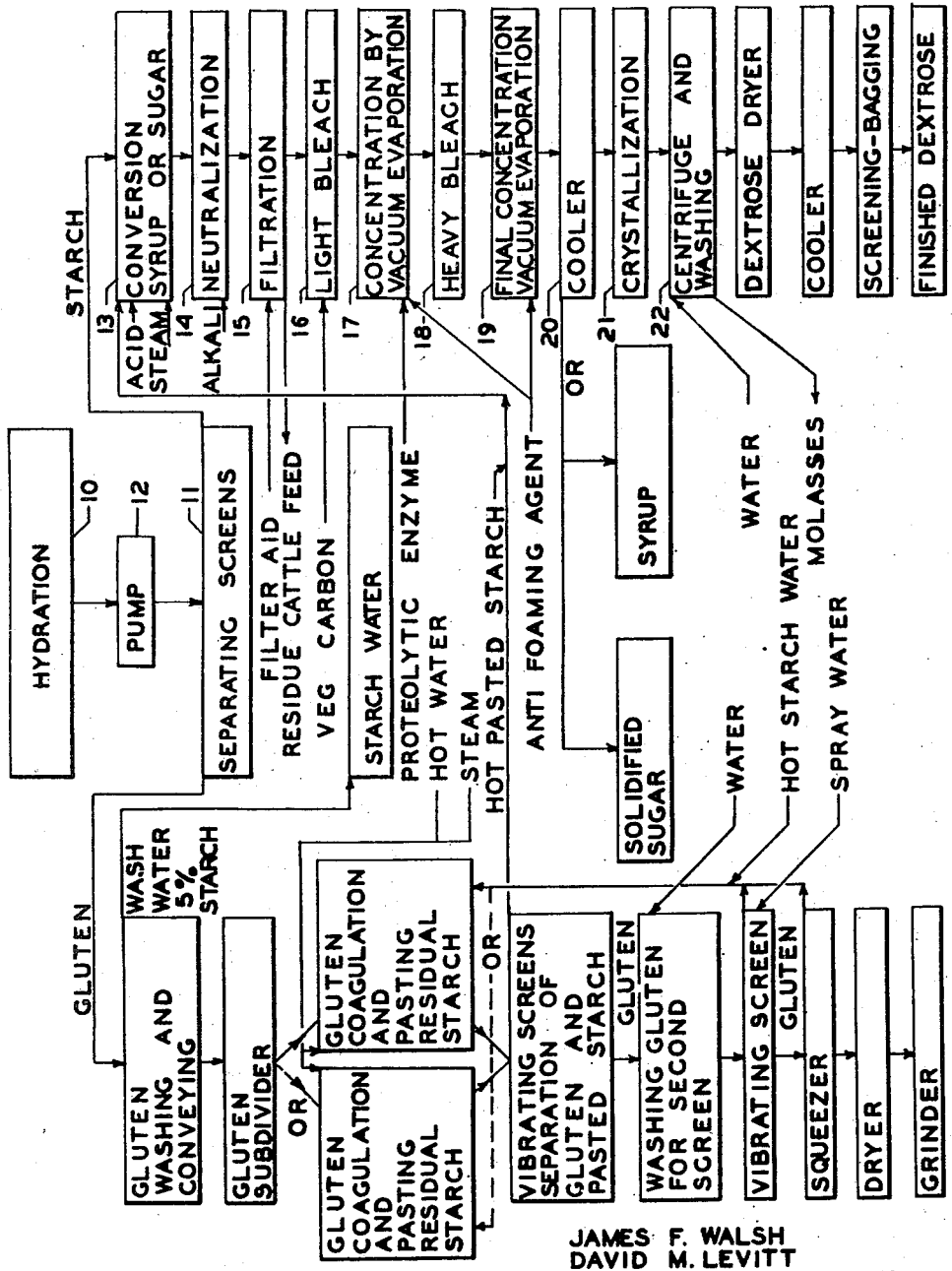

2,442,789

UNITED STATES PATENT OFFICE 2,442,789

CONVERSION OF WHEAT STARCH

James F. Walsh, Holland, Mich., David M. Levitt, Great Neck, N. Y., and Abraham H. Goodman, Holland, Mich., assignors to Doughnut Corporation of America, New York, N. Y., a corporation of New York Application November 11, 1944, Serial No. 562,980

10 Claims. (Cl. 195—11)

This invention relates to conversion of wheat starch, and among other objects aims to provide efficient and economical means for acid converting wheat starch to syrup and sugar.

The nature of the invention may be readily understood by reference to one illustrative process embodying the invention and illustrated in the accompanying drawing.

In said drawing, the figure is a diagram or "flow sheet" illustrating the process.

In the production of starch for conversion to sugar, syrups, etc., it has heretofore been considered necessary to employ prolonged treatment to eliminate solubles which interfered with efficient conversion. The treatment involving steeping, tabling or other settling, washing, etc., consumed a long time and by its very length resulted in additional solubles whose removal was necessary, and in deterioration of the product. Whether or not the solubles were recovered, their removal was expensive because of the large amounts of water used.

As hereinafter described, we have been able economically and efficiently to convert to syrup and sugar a wheat starch slurry of a character which the art has heretofore taught could not be converted by any practicable means. In particular this wheat starch slurry produced by the method next described contains certain desirable proteins and solubles which the art has heretofore regarded as preventing efficient conversion. Nevertheless these substances have substantial nutrient and other value which it is desirable to retain if possible and which according to our invention can be retained without preventing efficient conversion.

The process by which the aforesaid wheat starch slurry is produced is described in detail in our co-pending application Serial 561,476. The pertinent features of said process are repeated herein.

According to this process wheat is first treated to remove the germ and cellulosic materials such as bran and shorts. These contain respectively a substantial amount of solubles and cellulosic materials which it is highly desirable to exclude initially. They are removed by dry milling with conventional methods which permit their recovery intact and without substantial loss. The remainder of the wheat may be in granular form or in the form of flour or clears. The latter, a grade of flour below the so-called patent flours, is advantageous because of its cheapness. For present purposes it is the equivalent of flour even though it contains more fiber, ash and fat than patent flours. For convenience we shall hereinafter use the term flour in a generic sense to include wheat substantially lacking in bran, shorts and germ, regardless of its grade or fineness.

After the aforesaid preliminary separation, the flour (e. g., clears) comprising mainly protein (i. e., gluten) and starch are treated by mixing with water to hydrate the gluten to form a soft dough (wherein the starch particles are occluded) and develop the cohesive strength of the gluten. The amount of water must be limited to avoid initial dispersion of the gluten; preferably the amount of water is from 85 to 115% of the weight of dry flour, including the initial water content of the flour. Within these limits the water should preferably not exceed that necessary to make a dough sufficiently soft to facilitate hydration of the gluten and development of its cohesive strength. The amount of water for this purpose may vary somewhat with its temperature and the gluten content of the dough.

Hydration preferably takes place in a mixing vessel represented at 10 in the drawing to which the flour and water are added together, the water being preferably heated to about 50 degrees C., to obtain the desired softness of the dough with a minimum amount of water. The water temperature should not be high enough (preferably below 130 degrees F.) to hydrate or paste the starch. The details of the mixing vessel are disclosed in our said co-pending application. It will be sufficient here to point out that the function of the mixing vessel is first to form a soft dough without risking the danger of dispersion of the gluten, and after the formation of the dough and development of the cohesive strength of the gluten to sub-divide the gluten into small pieces by continued mixing or cutting action in conjunction with additional water then added to the vessel. This operation serves to wash out the occluded starch, forming a starch slurry containing gluten curds which are relatively free from starch but are of sufficient size so that they may subsequently be screen-separated from the starch slurry. Such separation takes place on vibratory or gyratory inclined screens represented at 11 to which the starch slurry and gluten curds are delivered from vessel 10 either by gravity or by a pump 12.

The starch slurry passes through the screens and is collected for subsequent treatment. It contains from 15 to 24% starch solids and from 2 to 4% protein including soluble protein.

As the gluten passes over the lower half of the screens it is advantageously further washed by fine water spray which is separately collected and in this case used as so-called "cutting water" for subdividing the gluten in vessel 10. It contains about 5% starch.

The subsequent coagulation and treatment of the gluten is described in our said co-pending application and for convenience illustrated diagrammatically herein at the left side of the drawing. Such description need not be repeated here except to point out that at various stages in its treatment the gluten is further purified by washing to remove adhering starch which has been pasted in the hot water in the tank used to coagulate the gluten. Such pasted starch may advantageously be returned to the aforesaid starch slurry for subsequent conversion or other treatment. It does not substantially dilute the slurry which even with this addition still contains from 15 to 24% solids.

The starch slurry thus produced contains about 2 to 4% protein of which the major portion is soluble protein. The art has heretofore regarded the presence of such protein solubles as preventing easy and efficient acid conversion to syrup and sugar. The remaining protein in the slurry is insoluble, comprising mainly a small amount of gluten which has escaped separation. Insoluble protein has likewise been regarded heretofore as highly objectionable because, among other objections, it would cloud syrup or contaminate the sugar. Prolonged and troublesome treatment has been employed heretofore to remove both the soluble and insoluble protein before conversion. None of these practices is employed here. Instead the starch slurry containing (except for the separated gluten) all valuable constituents of the flour including these soluble and insoluble proteins, is ready for conversion within thirty minutes of the time the flour and water were first mixed. There has been no time for deterioration, fermentation, etc., and much lost time and loss of valuable constituents which characterized previous methods of preparation of the starch for conversion, have been avoided.

Included in the illustration in the drawing is one illustrative method of acid conversion of the slurry to syrup and sugar. It will be noted from the drawing that the process operates in a closed circuit, thereby effecting both a saving of all constituents and avoiding stream pollution.

While conversion according to the illustrative process may be effected either at or above atmospheric pressure the former possesses some advantages presently noted. It should be understood however that conversion under pressure may be employed, and doubtless would be preferred where pressure converters are already available. For example, the converter 13 may be of very large capacity (e. g., 10,000 gal. and higher) compared with pressure-converter tanks (thereby being economical of man power), and may be made cheaply of wood which has a high resistance to acid attack. Though a somewhat higher acidity (pH of about 1.5 for conversion to dextrose) and a longer cycle (about 10 hours for dextrose and 3 to 4 hours for syrup) are required than for pressure-converters the high capacity, low cost and economy of operation will under some circumstances outweigh the advantages of a short cycle with lower acidity obtainable with small pressure-converters. Heat is supplied to the converter tank 13 preferably by introduction of steam from coils inside and near the bottom. A relatively small number of these converters operating successively can handle the output of a very large plant. The cycle of these converters being relatively slow can be interrupted at the optimum point for conversion to dextrose, whereas with pressure-converters the cycle is so rapid that reversion and loss of sugar occurs before the cycle can be terminated, or if reversion is to be avoided the cycle must be interrupted before the optimum point of conversion is reached.

The apparatus used in this and the following steps is conventional in sugar and syrup production and its details need not be illustrated or described.

Upon completion of conversion the syrup is neutralized with alkali at 14, passed through filter 15, and preferably carbon bleached as at 16. Thereafter it is delivered to the evaporators preferably of the multiple-stage, vacuum type. The filter cake from the filters has a market as cattle food and for other purposes. It is not waste.

After preliminary concentration in evaporator 17, the syrup is given a heavy bleach at 18, and then introduced into evaporator 19 for final concentration. The syrup is then cooled at 20, from which it is withdrawn for use as a concentrated syrup or so-called solidified or 70 sugar. Or if the syrup has been converted for crystallization to dextrose, it is withdrawn from the cooler and placed in crystallizers 21 from which it is introduced into the centrifugals 22 for separation of the crystallized dextrose from the molasses. The soluble protein and that solubilized as presently described pass through the centrifugals with the molasses.

The troublesome action of the protein solubles in the evaporators is counteracted by adding a minute amount of a non-toxic anti-foaming agent. If desired an edible anti-foaming agent such as an edible oil, e. g., cottonseed oil, may be employed. The amount added is extremely small, being a small fraction of 1% of the contents of the evaporator. With the addition of such antifoaming agent we have found that the syrup may be concentrated without difficulty on account of the presence of the soluble protein.

The clouding and other deleterious effects of the insoluble protein is eliminated by solubilizing the protein by adding to the syrup a small amount of a proteolytic enzyme, such as papain. At the proper temperature and pH the protein is effectively solubilized as is evidenced by excellent clarity of the syrup even when chilled. It has considerable nutritive value and may advantageously remain in the syrup. Clogging of filters is avoided and in making sugar it passes through the centrifugals with the molasses wherein its nutritive value is also important; and in addition it gives the molasses valuable characteristics useful in beer making, being chill proof (i. e., not clouding upon chilling) and stabilizing the foam.

The proteolytic enzyme may advantageously be added in the vacuum evaporators where the temperature is below 55° C. or such other temperature as will not inactivate the enzyme. The syrup remains in the evaporators about three hours and this allows ample time (about one hour) for the enzyme to act completely. For most efficient action the pH of the syrup should be within the optimum range for the most efficient action of the enzyme used. Generally this is within the range of 4 to 5.5, and if necessary the pH of the syrup should be adjusted for this purpose.

Obviously the invention is not limited to the details of the illustrative method and apparatus, Having described our invention, we claim:

1. In the method of purging crystallized dextrose formed by conversion of a wheat starch slurry containing insoluble proteins, the steps which comprise reducing the liquor after saccharification and concentration to a temperature below 55° C., adding such enzyme to the liquor to solubilize the proteins therein, crystallizing the sugar in the liquor, and then subjecting the same to centrifugal separation to cause the solubilized protein to pass off with the liquor.

2. The method of making crystallized dextrose from a wheat starch slurry containing 15 to 24 per cent starch solids and 2 to 4 per cent protein which comprises saccharifying the slurry with the protein remaining in it, then concentrating the saccharified liquor by multiple stage vacuum evaporation, and when the temperature of the liquor under concentration is reduced below 55° C. adding a proteolytic enzyme to the liquor to solubilize the protein, then crystallizing dextrose from the concentrated liquor, and subjecting the same to centrifugal separation to cause separation of the crystallized dextrose from the liquor and to cause the solubilized protein to pass off with the liquor.

3. The method of making starch conversion products from a wheat starch slurry containing 15% to 24% starch solids and 2% to 4% soluble and insoluble protein the major portion of which is soluble protein, which comprises saccharifying the slurry with said solubles and insolubles remaining in it, then concentrating the saccharified liquor and adding a proteolytic enzyme to the liquor to solubilize the insoluble protein, and then treating the concentrated liquor to remove solids wherein the solubilized protein remains with the liquor.

4. The method of making starch conversion products from a wheat starch slurry containing 15% to 24% starch solids and 2% to 4% protein, the major portion of which is soluble protein, which comprises saccharifying the slurry with the soluble protein remaining in it, then concentrating the saccharified liquor and adding a proteolytic enzyme to the liquor to solubilize residual insoluble protein, and then separating solids from the concentrated liquor so that on such separation the solubilized protein will remain with the liquor.

5. The method of making starch conversion products from a wheat starch slurry containing 15% to 24% starch solids and 2% to 4% soluble and insoluble protein which comprises saccharifying the slurry with the protein remaining in it, then concentrating the saccharified liquor by vacuum evaporation, adding an edible oil as an antifoaming agent to the liquor to permit concentration thereof with the protein remaining in it, then adding a proteolytic enzyme to the liquor to solubilize the insoluble protein fraction, and then centrifuging the concentrated liquor containing the crystallized sugar so that the solubilized protein will pass out with the liquor.

6. The method of making starch conversion products from a wheat starch slurry containing 15% to 24% starch solids and 2% to 4% soluble and insoluble protein which comprises saccharifying the slurry with the protein remaining in it, then concentrating the saccharified liquor by vacuum evaporation, adding an edible oil as an antifoaming agent to the liquor to permit concentration thereof with the protein remaining in it, then adding a proteolytic enzyme to the liquor to solubilize the insoluble protein fraction, crystallizing sugar from the liquor, and then centrifuging the concentrated liquor containing the crystallized sugar so the solubilized protein will pass out with the liquor.

7. The method of making starch conversion products from a wheat starch slurry containing 15% to 24% starch solids and 2% to 4% soluble and insoluble protein which comprises saccharifying the slurry with the protein remaining in it, then concentrating the saccharified liquor by vacuum evaporation, adding an edible oil as an anti-foaming agent to the liquor to permit concentration thereof with the protein remaining in it, then adding a proteolytic enzyme to the concentrated liquor to solubilize any insoluble proteins therein so that such protein will remain with the liquid phase instead of the solids during all subsequent treatment.

8. The method of making starch conversion products from a wheat starch slurry containing 15% to 24% starch solids and 2% to 4% soluble and insoluble protein, the major portion of which is soluble protein, which comprises saccharifying the slurry with the soluble and insoluble protein remaining in it, then concentrating the saccharified liquor, and then adding a proteolytic enzyme to the concentrated liquor to solubilize any insoluble protein therein so that such protein will remain with the liquid phase instead of the solids during all subsequent treatments.

9. In the manufacture of starch conversion products, including molasses and syrup having a high solubles and protein content, the steps which comprise forming from wheat flour a starch slurry containing not less than 15 to 24% starch solids and all the solubles in the wheat flour including 2 to 4% soluble and insoluble protein, which starch slurry is obtained by mixing wheat flour with a limited amount of water to agglomerate the wheat gluten and screening the gluten from the resulting starch slurry, using an amount of water so limited that the starch slurry from which the gluten has been separated and without intervening concentration contains not less than 15 to 24% starch solids and all the solubles in the flour including 2 to 4% soluble and insoluble protein, then directly and without intervening concentration converting said slurry in a single stage conversion before opportunity for deterioration and in its condition and concentration as separated from the gluten, adding a non-toxic anti-foaming agent to the converted liquor, and then concentrating the liquor.

10. In the manufacture of starch conversion products, including molasses and syrup having a high solubles and protein content, the steps which comprise forming from wheat flour a starch slurry containing not less than 15 to 24% starch solids and all the solubles in the wheat flour including 2 to 4% soluble and insoluble protein, which starch slurry is obtained by mixing wheat flour with a limited amount of water to agglomerate the wheat gluten and screening the gluten from the resulting starch slurry, using an amount of water so limited that the starch slurry from which the gluten has been separated and without intervening concentration contains not less than 15 to 24% starch solids and all the solubles in the flour including 2 to 4% soluble and insoluble protein, then acid-converting said slurry in a single stage conversion before opportunity for deterioration and in its condition and concentration as separated from the gluten, adding an edible, non-toxic anti-foaming agent, concentrating the converted liquor, solubilizing the protein therein, so that on filtering the protein as well as the aforesaid solubles will remain with the liquor, and then filtering the converted liquor.

JAMES F. WALSH.
DAVID M. LEVITT.
ABRAHAM H. GOODMAN.

REFERENCES CITED

The following references are of record in the file of this patent:

UNITED STATES PATENTS

| Number | Name | Date |
|---|---|---|
| 235,053 | Gassaway | Nov. 30, 1880 |
| 334,245 | Lauer | Jan. 12, 1886 |
| 995,825 | Wallerstein | June 20, 1911 |
| 997,873 | Wallerstein | July 11, 1911 |
| 1,556,825 | Lenders et al. | Oct. 13, 1925 |
| 1,964,641 | Mathias | June 26, 1934 |
| 2,094,558 | Daley et al. | Sept. 28, 1937 |
| 2,096,549 | Jersey | Oct. 19, 1937 |
| 2,268,902 | Ryan | Jan. 6, 1942 |
| 2,280,085 | Ventre | Aug. 21, 1942 |
| 2,307,491 | Daley et al. | Jan. 5, 1943 |
| 2,307,725 | Daley et al. | Jan. 5, 1943 |

OTHER REFERENCES

Sherwood, Jellying of Sorghum Syrup, Ind. Eng. Chem. 15, 780 (1923).

Radley, Starch und 1st. Derivatives, 2nd edition, pages 169 and 213 (1944).

Eynon & Lane, Starch, pages 144 and 145 (1928).

Rehwald, Starch Making, pages 145–150 (1926).

Balls et al., Cereal Chemistry, 13, 60 (1936).